United States Patent
Kobayashi et al.

(10) Patent No.: US 7,199,807 B2
(45) Date of Patent: Apr. 3, 2007

(54) MIXED REALITY PRESENTATION METHOD AND MIXED REALITY PRESENTATION APPARATUS

(75) Inventors: Toshihiro Kobayashi, Kanagawa (JP); Toshikazu Ohshima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 174 days.

(21) Appl. No.: 10/981,563

(22) Filed: Nov. 5, 2004

(65) Prior Publication Data
US 2005/0104882 A1    May 19, 2005

(30) Foreign Application Priority Data
Nov. 17, 2003    (JP) .............. 2003-386937

(51) Int. Cl.
*G09G 5/00*    (2006.01)
(52) U.S. Cl. ........................ 345/633; 345/422
(58) Field of Classification Search ............... None
See application file for complete search history.

(56) References Cited

U.S. PATENT DOCUMENTS

| | | | |
|---|---|---|---|
| 5,416,893 A * | 5/1995 | Herrell et al. .............. 345/422 |
| 6,792,370 B2 | 9/2004 | Satoh et al. .................. 702/95 |
| 6,961,057 B1 * | 11/2005 | Van Dyke et al. .......... 345/422 |
| 2002/0060678 A1 * | 5/2002 | Sowizral et al. ............ 345/420 |
| 2002/0149600 A1 * | 10/2002 | Van Splunter et al. ...... 345/592 |
| 2003/0184682 A1 | 10/2003 | Kobayashi .................. 348/589 |
| 2003/0189568 A1 * | 10/2003 | Alkouh ....................... 345/422 |
| 2004/0036687 A1 * | 2/2004 | Nakamura et al. .......... 345/422 |
| 2004/0109009 A1 | 6/2004 | Yonezawa et al. .......... 345/632 |
| 2004/0125103 A1 * | 7/2004 | Kaufman et al. ........... 345/419 |
| 2004/0145594 A1 | 7/2004 | Kobayashi et al. ......... 345/633 |
| 2004/0249594 A1 | 12/2004 | Satoh et al. ................ 702/104 |

* cited by examiner

*Primary Examiner*—Mark Zimmerman
*Assistant Examiner*—Kevin Xu
(74) *Attorney, Agent, or Firm*—Fitzpatrick, Cella, Harper & Scinto

(57) ABSTRACT

A set of objects to be rendered by an identical rendering method is specified from objects which form a virtual space. A hierarchical structure formed by the object included in the specified set is generated. The objects included in the specified set are rendered by the rendering method common to the objects included in this set in accordance with the generated hierarchical structure.

7 Claims, 5 Drawing Sheets

FIG. 3
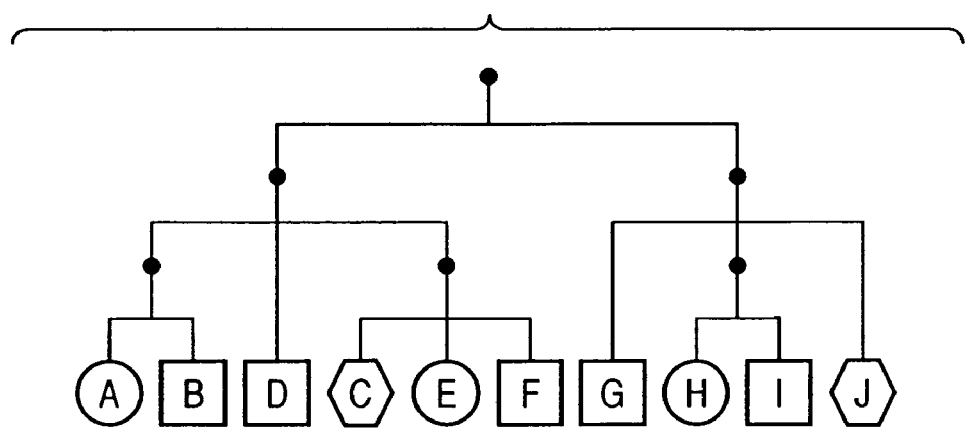
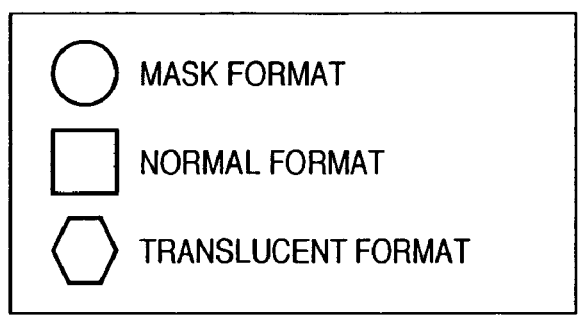

FIG. 4
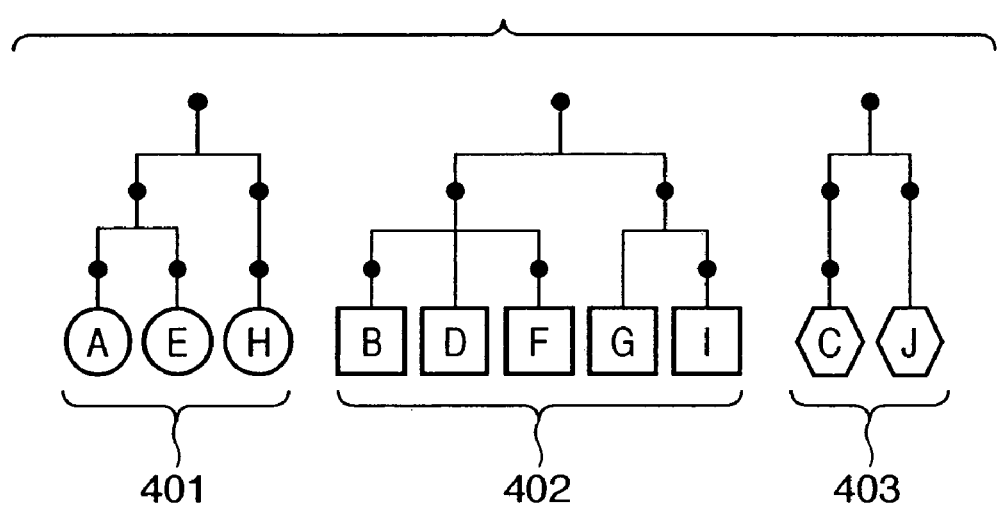
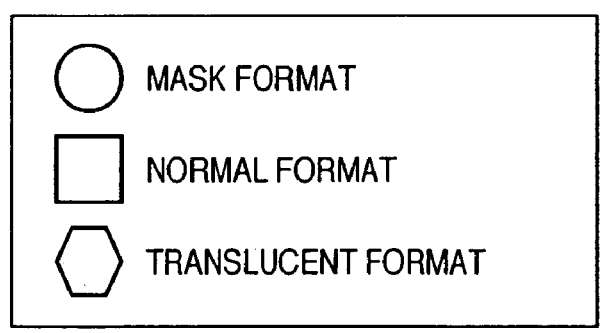

MIXED REALITY PRESENTATION METHOD AND MIXED REALITY PRESENTATION APPARATUS

FIELD OF THE INVENTION

The present invention relates to a technique for generating an image on a virtual space to be superimposed on a real space so as to present mixed reality to an observer.

BACKGROUND OF THE INVENTION

Apparatuses that adopt a mixed reality (MR) technique which can naturally combine the real and virtual worlds have been extensively proposed. These MR presentation apparatuses combine an image on the real space sensed by an image sensing device such as a camera or the like to an image on the virtual space rendered by computer graphics (CG) and present the composite image to the user.

The MR presentation apparatus normally uses a method of rendering an actually sensed real image first as a background, and then rendering CG objects that form the virtual world to composite them onto the background. However, with this method, since the virtual world is always rendered to exist in front of the real world, appropriate expression cannot be made when an object on the real world is to be displayed occluding the virtual world.

Under the circumstance, objects on the real world (real objects) are often modeled in advance and are handled as CG objects. Then, CG objects of the real objects are rendered before rendering virtual CG objects. In this case, the CG objects of the real objects are not rendered on a frame buffer, but are rendered only on a Z buffer. With this process, upon rendering the virtual CG objects, the depth ordering of the virtual CG objects and the CG objects of the real objects is checked. A portion of a given CG object on the virtual world, which is present at the back of the CG object of the real object, is not rendered on the frame buffer.

Hence, the object on the real world can be displayed as if it were occluding the virtual world. Especially, in this case, the CG object of this real object is called a mask object, and a visual expression format as the characteristics of the appearance of the mask object is called a mask format. On the other hand, a visual expression format of a normal virtual CG object is called a normal format.

Normally, after the depth ordering on the Z buffer is checked, rendering on the frame buffer is made. For this reason, rendering of a mask object that updates only the Z buffer, and rendering of a virtual CG object which updates both the frame buffer and Z buffer cannot be simultaneously done, and rendering must be separately done twice. Upon rendering the virtual CG object and mask object, a desired result cannot be obtained unless rendering is made in the order of the mask object and virtual CG object.

When a reflected image of a virtual CG object on a reflecting object such as a real or virtual glass or the like is expressed, or when a virtual object is rendered by simulating a display apparatus such as an optical see-through head-up display, rendering is not made on the Z buffer but is made only on the frame buffer. Especially, a CG object rendered by such scheme is called a translucent object, and a visual expression format of the translucent object is called a translucent format.

Rendering of the translucent object normally uses a scheme called alpha blend. In this scheme, a transparency coefficient called an alpha value is set in advance for the translucent object, and upon updating the frame buffer, the pixel values of a region to be rendered before update are composited to those of the translucent object at a ratio according to the alpha value, thus rendering the translucent CG object. However, when a reflected image of a virtual CG object onto a reflecting object is to be expressed or when display that simulates an optical see-through display device is to be made, the composition method based on alpha blend has poor reality.

When a normal virtual CG object, mask object, and translucent object simultaneously appear in an identical scene, the depth ordering on the Z buffer is checked and, after that, rendering on the frame buffer is made. Hence, rendering of the mask object that updates only the Z buffer, rendering of the virtual CG object that updates both the frame buffer and Z buffer, and rendering of the translucent object that updates only the frame buffer cannot be made at the same time, and rendering must be separately made a plurality of times.

The order of rendering must also be taken into consideration. For example, when a normal virtual CG object and mask object appear in an identical scene, hidden surface removal of a CG object is made using the result rendered so far on the Z buffer upon rendering on the frame buffer. Hence, the mask object must be rendered first. If this rendering order is reversed, occlusion of the real world by the mask object cannot be correctly expressed. When a normal virtual CG object and translucent object appear in an identical scene, the pixel values of an image rendered on the frame buffer are referred to upon rendering the translucent object. Hence, the normal virtual CG object must be rendered first. If this rendering order is reversed, the translucent object is occluded by other objects.

That is, in a scene including the three different types of objects, rendering must be made in the order of the mask object, normal virtual CG object, and translucent object. Since these three types of objects are rendered on different buffers, rendering processes must be independently done in correspondence with objects to be rendered.

Hence, in the conventional apparatus, the user must separately prepare for a mechanism that independently renders objects in consideration of the rendering order and rendering methods in correspondence with the visual expression formats as the characteristics of appearance of objects to be rendered. Hence, such apparatus requires the user to have advanced knowledge and to put in thousands of man-hours.

SUMMARY OF THE INVENTION

The present invention has been made in consideration of the above problems, and has as its object to provide a technique that can render objects with disregard to the rendering order and rendering methods for respective visual expression formats of objects even in a scene including objects having different visual expression formats.

In order to achieve an object of the present invention, for example, a mixed reality presentation method of the present invention comprises the following arrangement.

That is, a mixed reality presentation method for generating a virtual space image to be superimposed on a real space, comprising: a first holding step of holding data indicating a rendering method upon rendering objects that form a virtual space; a second holding step of holding data indicating a hierarchical structure among objects that form the virtual space; a configuration step of configuring a set of objects to be rendered by an identical rendering method on the basis of objects that form the virtual space with reference to the data held in the first holding step; a generation step of generating a hierarchical structure formed by objects included in the set configured in the configuration step with reference to the data held in the second holding step; and a rendering step of rendering each object included in the set configured in the configuration step in accordance with the rendering method common to the objects included in that set and the hierarchical structure generated in the generation step, and in that the processes in the generation step and rendering step are performed for each of one or more sets configured in the configuration step.

In order to achieve an object of the present invention, for example, a mixed reality presentation apparatus of the present invention comprises the following arrangement.

That is, a mixed reality presentation apparatus for generating a virtual space image to be superimposed on a real space, comprising: first holding unit adapted to hold data indicating a rendering method upon rendering objects that form a virtual space; second holding unit adapted to hold data indicating a hierarchical structure among objects that form the virtual space; configuration unit adapted to configure a set of objects to be rendered by an identical rendering method on the basis of objects that form the virtual space with reference to the data held by the first holding unit; generation unit adapted to generate a hierarchical structure formed by objects included in the set configured by the configuration unit with reference to the data held by the second holding unit; and rendering unit adapted to render each object included in the set configured by the configuration unit in accordance with the rendering method common to the objects included in that set and the hierarchical structure generated by the generation unit, and in that the processes of the generation unit and rendering unit are performed for each of one or more sets configured by the configuration unit.

In order to achieve an object of the present invention, for example, a mixed reality presentation method of the present invention comprises the following arrangement.

That is, a mixed reality presentation method comprising: a virtual space information storage step of holding CG object data and scene data required to form a virtual space; a visual expression format storage step of holding information associated with a visual expression format upon rendering each CG object; a visual expression format setting step of making a user arbitrarily change a visual expression format of each CG object; a scene graph multipass rendering step of appropriately selecting rendering method of each CG object in accordance with a visual expression on the basis of information in the virtual space information storage step, the visual expression format storage step, and the visual expression format setting step; a mask object rendering step of rendering a CG object with a mask format; a normal object rendering step of rendering a CG object with a normal format; a translucent object rendering step of rendering a CG object with a translucent format; and an image display step of presenting an image generated by compositing a real space image and virtual space image to the user.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a view showing an example of the hierarchical structure among objects which form the virtual space;

FIG. 4 shows a scene graph generated based on the scene graph shown in FIG. 3 in association with visual expression formats.

DETAILED DESCRIPTION OF THE PREFERRED EMBODIMENTS

Preferred embodiments of the present invention will now be described in detail in accordance with the accompanying drawings.

First Embodiment

Figure 5:
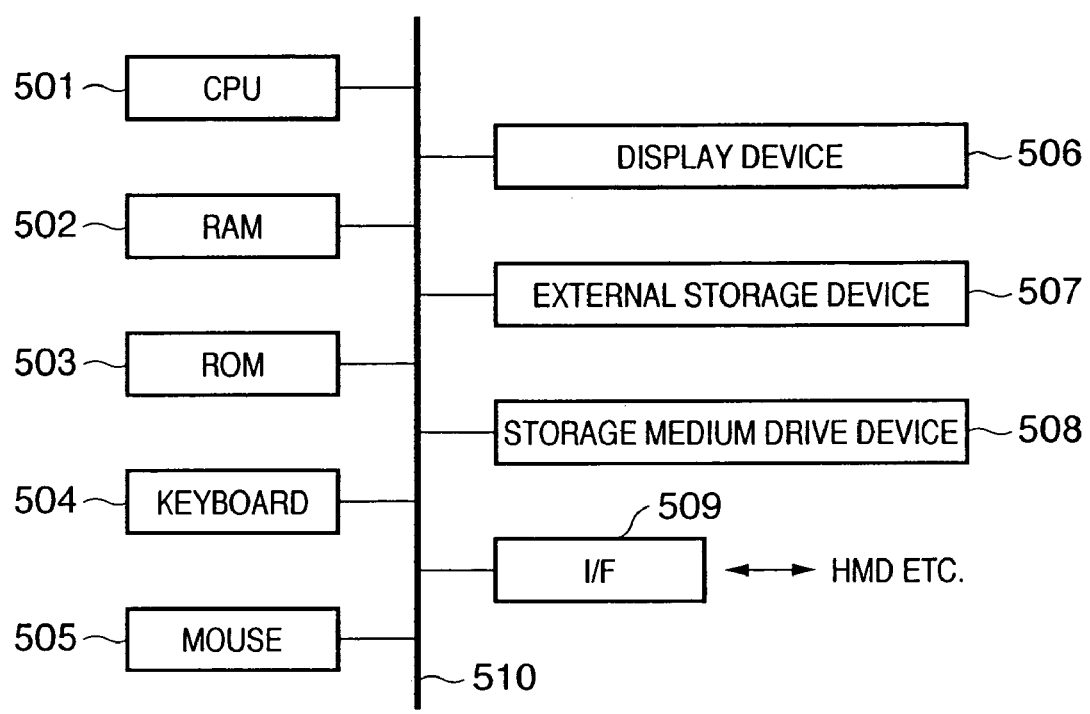
FIG. 5 is a block diagram showing the basic arrangement of a computer which serves as the MR space presentation apparatus according to the first embodiment of the present invention.

FIG. 5 is a block diagram showing the basic arrangement of a computer which serves as an MR space presentation apparatus according to this embodiment.

Reference numeral 501 denotes a CPU which controls the overall apparatus and executes a virtual space image generation process, a superimposing process with the real space (to be described in detail later; this process may be skipped in some cases), and the like using programs and data stored in a RAM 502 and ROM 503.

Reference numeral 502 denotes a RAM which has an area for temporarily storing programs and data loaded from an external storage device 507 and storage medium drive device 508, and a work area used by the CPU 501 to execute various processes. In this embodiment, assume that an area that serves as a frame buffer and an area that serves as a Z buffer are assured on the RAM 502.

Reference numeral 503 denotes a ROM which stores a program for controlling the overall apparatus, a boot program for launching this apparatus, and the like.

Reference numerals 504 and 505 respectively denote a keyboard and mouse, which serve as a user interface used to input various instructions to the CPU 501. However, other devices may be used as the user interface, which is not limited to the keyboard and mouse.

Reference numeral 506 denotes a display device which comprises a CRT, liquid crystal display, or the like, and can display the processing result of the CPU 501 as characters and images.

Reference numeral 507 denotes an external storage device which serves as a large-capacity storage device such as a hard disk drive device or the like, and saves programs and data that make the CPU 501 execute a series of processes for presenting MR to an observer who wears, on the head, an HMD (not shown) connected to this apparatus via an interface 509.

The external storage device 507 also saves data required to render images on the virtual space, e.g., data (shape data, texture data, and the like of objects) associated with objects which form the virtual space, data indicating an environment (e.g., the size, position, and the like) of the virtual space, and the like.

These programs and data are read out onto the RAM 502 as needed under the control of the CPU 501.

Reference numeral 508 denotes a storage medium drive device which reads out programs and data recorded on a storage medium such as a CD-ROM, DVD-ROM, or the like, and outputs them to the RAM 502 or external storage device 507. Note that programs and data saved by the external storage device 507 may be recorded on this storage medium, and these programs and data may be loaded onto the RAM 502 via the storage medium drive device 508.

Reference numeral 509 denotes an interface (I/F), which is used to connect the HMD worn by the observer on the head so as to present an image (i.e., MR space image) generated by superimposing the virtual space on the real space to the observer.

When the HMD is connected to the interface 509, if this HMD is of optical see-through type, a virtual space image generated by this apparatus (MR representation apparatus) is output to the display unit of the HMD via the interface 509; if this HMD is of video see-through type, a real space image sensed by an image sensing device such as a camera or the like, which is mounted on the HMD, is input to this apparatus via the interface 509, and an image (i.e., MR space image) generated by superimposing the virtual space image generated by this apparatus onto this virtual space image is output onto the display unit of the HMD via this interface 509.

Reference numeral 510 denotes a bus which interconnects the aforementioned units.

Figure 1:
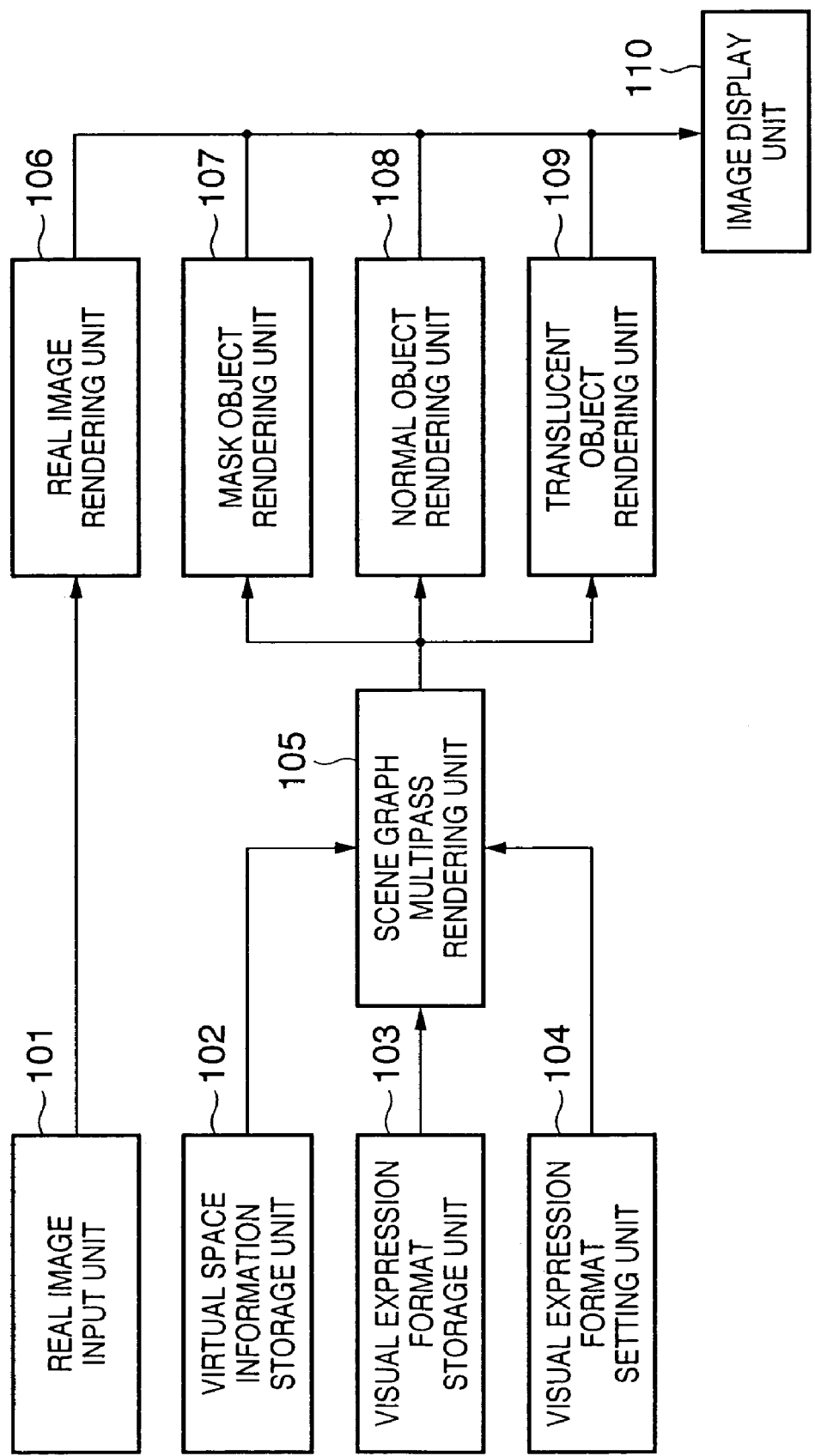
FIG. 1 is a block diagram showing the functional arrangement of a system including an MR space presentation apparatus according to the first embodiment of the present invention.

FIG. 1 is a block diagram showing the functional arrangement of a system including the MR space presentation apparatus according to this embodiment.

A real image input unit 101 serves as an interface for inputting a real space image sensed by an image sensing device such as one or more cameras or the like mounted on the HMD to a real image rendering unit 106. When the HMD is of optical see-through type, no real space image is input to this apparatus, and the real image input unit 101 and real image rendering unit 106 are omitted.

A virtual space information storage unit 102 stores data associated with objects which form the virtual space, and data associated with the virtual space such as data of scene graphs each indicating the hierarchical structure among objects which form the virtual space, and the like. Note that "data associated with objects which form the virtual space" includes, e.g., shape information, texture information, and the like of each individual object. That is, this data is information (data) required to render each individual object. Also, this data includes text information to be presented to the observer.

On the other hand, "scene graph" is a data structure which describes the entire scene by hierarchizing and structuralizing objects which form the virtual space and laying them out on a scene. The scene graph also describes position/orientation information in the virtual space where each individual object is laid out. For example, Open Inventor (registered mark) as a graphics library of SGI executes rendering processes of respective objects with reference to data of the scene graph, thus efficiently implementing rendering of objects while maintaining the hierarchical structure among objects in the scene.

A visual expression format storage unit 103 holds data indicating visual expression formats of respective objects in association with information that specifies each individual object. For example, the unit 103 holds a table that stores ID numbers unique to respective objects and data indicating the visual expression formats in association with each other. The visual expression formats include, e.g., a mask format, normal format, and translucent format.

The mask format is used to express a situation in that a real object on the real space affects on the virtual space (e.g., occlusion of a virtual object by a real object, or the like), as described above. The normal format is used to render a virtual object (so-called "object" in this embodiment) on the virtual space. The translucent format is used to, e.g., express a reflected image of the virtual space on a glass on the real space, and to simulate an optical see-through type display device such as a head-up display or the like.

The visual expression format storage unit 103 holds the visual expression formats for respective objects that form the virtual space in this way. As has been explained as the prior art, if objects have different visual expression formats, objects require different image rendering methods (how to use the frame buffer and/or the Z buffer upon rendering). In other words, the visual expression format storage unit 103 holds data indicating image rendering methods of respective objects.

Note that data indicating the visual expression format for one object may include data indicating two or more visual expression formats (e.g., the normal and translucent formats), and the format to be actually set may be selected. In this case, a visual expression format setting unit 104 selects one to be actually set from the two or more visual expression formats. The operator may make this choice or the format to be selected may be set in accordance with data which is set in advance. Also, the visual expression format setting unit 104 may add a new visual expression format to data indicating the visual expression format for one object.

When the data indicating the visual expression format for one object includes two visual expression formats (the visual expression format setting unit 104 may add a new format to include data indicating two visual expression formats), if the visual expression format setting unit 104 selects any one format, the selected visual expression format is set for this object. The data of the set visual expression format is held in the visual expression format storage unit 103 in association with information required to specify this object.

A scene graph multipass rendering unit 105 receives an instruction of objects to be rendered for respective visual expression formats. That is, the unit 105 receives an instruction to render objects in the order of the mask format, normal format, and translucent format.

In this way, the scene graph multipass rendering unit 105 specifies a set of objects to be rendered by the same rendering method (i.e., a set of objects to be rendered by the mask format, a set of objects to be rendered by the normal format, and a set of objects to be rendered by the translucent format) with reference to data held by the visual expression format storage unit 103, reads out data of each object included in the specified set from the virtual space information storage unit 102, and outputs the readout data to one of a mask object rendering unit 107, normal object rendering unit 108, and translucent object rendering unit 109.

The scene graph multipass rendering unit 105 executes a process for generating scene graph data indicating the hierarchical structure formed by objects set with the same visual expression format as the designated visual expression format using scene graph data held by the virtual space information storage unit 102. Details of this process will be described later.

In this way, the scene graph multipass rendering unit 105 specifies a set of objects set with the same visual expression format as the designated visual expression format, and outputs data required to respective objects included in the specified set and scene graph data indicating the hierarchical structure formed by the objects included in the specified set. By executing a series of output processes for the mask format, normal format, and translucent format, the scene graph multipass rendering unit 105 can output data required to render objects and scene graph data for each set of objects which are to be rendered by the same rendering method.

If a given visual expression format does not appear in a scene, that visual expression format is not instructed to the scene graph multipass rendering unit 105.

The aforementioned process executed by the scene graph multipass rendering unit 105, i.e., the process for specifying a set of objects which are set to be rendered by the same rendering method with reference to data held by the visual expression format storage unit 103, reading out data of respective objects included in the specified set, and outputting them to one of the mask object rendering unit 107, normal object rendering unit 108, and translucent object rendering unit 109, will be described in more detail below.

In this embodiment, as described above, an object rendering instruction is issued for each visual expression format. Upon reception of this instruction, the scene graph multipass rendering unit 105 specifies information (e.g., ID number) required to specify objects which are set to have the same visual expression format as that of the received instruction (objects which are previously set using the visual expression format setting unit 104, as described above) with reference to data held by the visual expression format storage unit 103. This process can be implemented by specifying information required to specify objects associated with the designated visual expression format, since the visual expression format storage unit 103 stores data indicating the visual expression formats of respective objects in association with information required to specify objects. In this way, the scene graph multipass rendering unit 105 can acquire information required to specify objects which are set to have the same visual expression format as the designated visual expression format.

Next, the scene graph multipass rendering unit 105 reads out, using the "information required to specify objects which are set to have the same visual expression format as the designated visual expression format" acquired by the above process, data required to render objects specified by that information from data held by the virtual space information storage unit 102.

In this way, the scene graph multipass rendering unit 105 can read out data required to render objects included in a set of objects, which are set with the same visual expression format as the designated visual expression format.

Obviously, the data of respective objects read out by the scene graph multipass rendering unit 105 are to be rendered according to the visual expression format common to those objects. Since one of the three formats is set as this visual expression format, the object data read out by the scene graph multipass rendering unit 105 and scene graph data generated for the set to which the readout objects belong are output to different destinations depending on one of these three formats.

For example, when the visual expression format designated by the instruction to the scene graph multipass rendering unit 105 is the mask format, object data read out by the scene graph multipass rendering unit 105 are those with the mask format, the generated scene graph data indicates the hierarchical structure among the objects which are set to be rendered by the mask format, and these object data and scene graph data are output to the mask object rendering unit 107.

When the visual expression format designated by the instruction to the scene graph multipass rendering unit 105 is the normal format, object data read out by the scene graph multipass rendering unit 105 are those with the normal format, the generated scene graph data indicates the hierarchical structure among the objects which are set to be rendered by the normal format, and these object data and scene graph data are output to the normal object rendering unit 108.

When the visual expression format designated by the instruction to the scene graph multipass rendering unit 105 is the translucent format, object data read out by the scene graph multipass rendering unit 105 are those with the translucent format, the generated scene graph data indicates the hierarchical structure among the objects which are set to be rendered by the translucent format, and these object data and scene graph data are output to the translucent object rendering unit 109.

Each of the mask object rendering unit 107, normal object rendering unit 108, and translucent object rendering unit 109 executes a process for rendering a scene graph according to the corresponding visual expression format using the object data and scene graph data received from the scene graph multipass rendering unit 105. Note that "rendering of a scene graph" indicates a process for rendering images of respective objects that form the scene graph in accordance with the hierarchical structure of the objects.

The mask object rendering unit 107 adopts the same mask object rendering method as the conventional method. That is, (since the Z buffer stores data indicating infinity in an initial state), the process for writing z-coordinate values of pixels that form an image of each mask object is executed. More specifically, in this process, the z-coordinate value of a given pixel that forms an image of each mask object is compared with the z-coordinate value stored at a position in the z-buffer corresponding to the position of that pixel, and a smaller z-coordinate value (closer to the viewpoint position) is recorded in the Z buffer.

Also, the normal object rendering unit 108 adopts the same rendering method as the conventional method. That is, the z-coordinate value of a given pixel that forms an image of each normal object (i.e., the z-coordinate value at a position on the normal object indicated by that pixel) is compared with the z-coordinate value indicated by data stored in the Z-buffer, and a smaller z-coordinate value (closer to the viewpoint position) is recorded in the frame buffer. Also, when the z-coordinate value of the pixel to be compared in the frame buffer is smaller than that of the pixel to be compared in the Z buffer, a process for updating the z-coordinate value of the pixel to be compared in the Z buffer to that of the pixel to be compared in the frame buffer is executed. In this manner, the Z buffer always stores the z-coordinate values closer to the viewpoint position. With this process, even when two objects overlap each other from the perspective of the viewpoint position, a portion closer to the viewpoint position is rendered on the front side.

The translucent object rendering unit 109 adopts the same rendering method as the conventional method. That is, an image of an object to be rendered on the frame buffer as a translucent object and an image that has already been stored in the frame buffer undergo a known blending process (α blend process in this embodiment), thus forming a translucent object image on the image that has already been stored in the frame buffer.

When no mask objects are set in a scene or are rendered, since the mask object rendering unit 107 is not necessary, it may be omitted. Also, when no translucent objects are set in a scene or are rendered, since the translucent object rendering unit 109 is not necessary, it may be omitted.

The real image rendering unit 106 executes a process for rendering a real space image input from the real image input unit 101. As described above, when the HMD is of optical see-through type, since no real space image is input to this apparatus, the real image rendering unit 106 is not required as well as the real image input unit 101.

An image display unit 110 corresponds to display units which are located in front of the eyes of the observer who wears the HMD, and displays an image generated by superimposing a virtual space image formed by images of objects rendered by any of the mask object rendering unit 107, normal object rendering unit 108, and translucent object rendering unit 109 onto the real space image which is input from the real image input unit 101 and is rendered by the real image rendering unit 106. When the HMD is of optical see-through type, since no real space image is input to this apparatus, the image display unit 110 allows the real space to be seen through by the observer, and displays the virtual space image on the transmitting surface.

The aforementioned units form the functional arrangement of the system including the MR presentation apparatus according to this embodiment. In this embodiment, the real image rendering unit 106, scene graph multipass rendering unit 105, mask object rendering unit 107, normal object rendering unit 108, and translucent object rendering unit 109 are implemented as programs. That is, these units are loaded onto the RAM 502 as programs which make the CPU 501 implement the functions of the units.

Also, the virtual space information storage unit 102 and visual expression format storage unit 103 correspond to storage areas assured on the external storage device 507, and the real image input unit 101 corresponds to the interface 509. Furthermore, the visual expression format setting unit 104 corresponds to the keyboard 504 and mouse 505.

However, the units shown in FIG. 1 are not limited to the aforementioned forms. For example, the respective units shown in FIG. 1 may be implemented by hardware.

Figure 2:
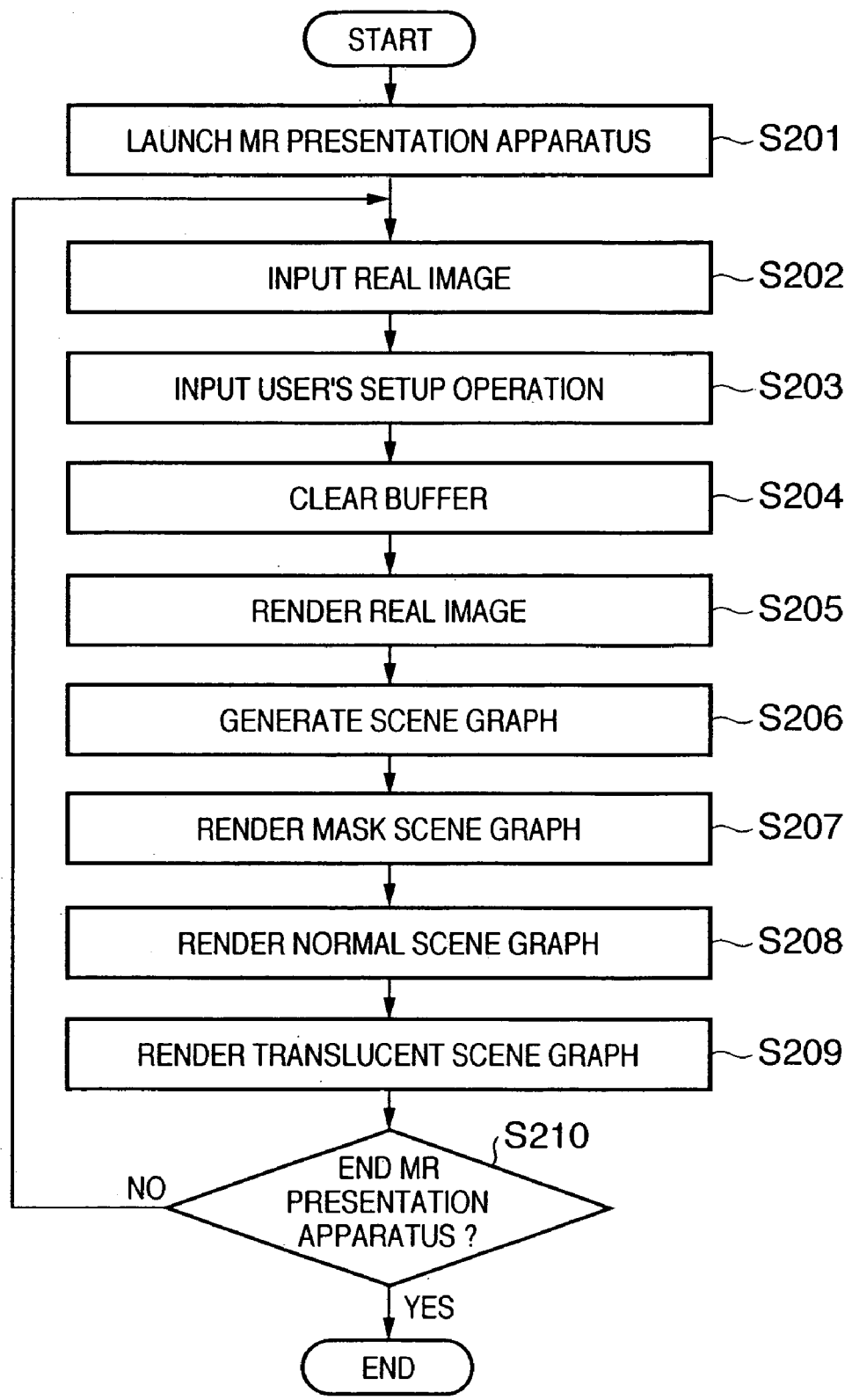
FIG. 2 is a flowchart of a process which is executed by the MR space presentation apparatus according to the first embodiment of the present invention to generate an image on the virtual space and superimpose and output it onto an image on the real space.

The process which is executed by the MR presentation apparatus according to this embodiment to generate a virtual space image, superimpose it onto a real space image, and output the composite image will be described below using FIG. 2 which shows the flowchart of that process. Note that a program according to the flowchart shown in FIG. 2 is loaded onto the RAM 502 and is executed by the CPU 501, thus implementing processes to be described below by the MR presentation apparatus according to this embodiment.

Prior to the process to be described below, assume that scene graph data required to render respective objects that form the virtual space are stored in the storage area which is assured on the external storage device 507 and corresponds to the virtual space information storage unit 102.

In order to launch the MR presentation apparatus, the CPU 501 executes an OS program saved in the external storage device 507, a boot program in the ROM 503, and the like, thus executing an initialization process of this apparatus (this initialization process includes those for respective processes to be executed) (step S201).

After this apparatus is launched and the initialization process of this apparatus is completed, a real space image sensed by the image sensing device such as a camera or the like mounted on the HMD is input to this apparatus via the I/F 509, and is stored in a predetermined area in the RAM 502 (step S202). If the HMD is of optical see-through type, since no image sensing process of a real space image is made, the process in step S202 is skipped.

The operator inputs a visual expression format of each object which forms the virtual space using the keyboard 504 or mouse 505 (step S203). Data indicating the input visual expression format is stored in the storage area corresponding to the visual expression format storage unit 103 in the external storage device 507 in association with information used to specify the object as a setting destination.

For example, the display device 506 identifiably displays a desired one of objects which form the virtual space, which can be selected using the keyboard 504 or mouse 505, and also displays a menu of a visual expression format to be set for the selected object (this menu displays three selection items "normal format", "mask format", and "translucent format").

The operator selects one format from this menu using the keyboard 504 or mouse 505. After selection, data indicating the selected visual expression format is stored in a storage area corresponding to the visual expression format storage unit 103 in the external storage device 507 in association with information used to specify the currently selected object.

Note that a default visual expression format may be set depending on objects, and a setup process for that object may be skipped in such case.

The frame buffer and Z buffer assured on the RAM 502 are cleared (step S204). For example, clearing the frame buffer is to pad the contents of the frame buffer with data indicating zero. Also, clearing the Z buffer is to pad the contents of the Z buffer with data indicating infinity.

The real space image stored in the predetermined area in the RAM 502 in step S202 is written in the frame buffer (step S205). Note that the process for writing an image on the frame buffer is also expressed by "rendering". If the HMD is of optical see-through type, since no image sensing process of a real space image is made, the process in step S205 is skipped.

Next, a process for generating, as a scene graph, the hierarchical structure formed by objects in each set of objects to be rendered by the same rendering method of those which form the virtual space is executed (step S206). The process in step S206 will be described in detail below.

The CPU 501 executes a program corresponding to the scene graph multipass rendering unit 105 to read out scene graph data stored in the storage area corresponding to the virtual space information storage unit 102 in the external storage device 507 onto a predetermined area in the RAM 502. This scene graph data indicates the hierarchical structure among objects that form the virtual space, as described above.

FIG. 3 shows an example of the hierarchical structure among objects that form the virtual space. The following explanation will be given taking the scene graph shown in FIG. 3. However, as can be seen from the following description, the gist of the following description can be applied to scene graphs other than that shown in FIG. 3.

In FIG. 3, objects set to be rendered by the mask format are indicated by circles, and objects A, E, and H are such objects. Also, objects set to be rendered by the normal format are indicated by circles, and objects B, D, F, G, and I are such objects. Furthermore, objects set to be rendered by the translucent format are indicated by circles, and objects C and J are such objects.

When the mask format is designated, since a rendering instruction of objects set to be rendered by the mask format, i.e., objects A, E, and H, is issued, scene graph data indicating the hierarchical structure among these three objects is required upon their rendering. Hence, when the mask format is designated, a scene graph indicating the hierarchical structure formed by objects A, E, and H is generated based on the scene graph shown in FIG. 3. More specifically, a scene graph indicating the hierarchical structure formed by only objects A, E, and H is generated while maintaining the hierarchical structure among objects A, E, and H in the hierarchical structure shown in FIG. 3.

The generated scene graph is denoted by 401 in FIG. 4. As can be seen from FIG. 4, the scene graph 401 indicating the hierarchical structure formed by only objects A, E, and H is generated while maintaining the hierarchical structure among objects A, E, and H in the hierarchical structure shown in FIG. 3.

The same applies to a case wherein the normal format or translucent format is designated in step S203.

For example, when the normal format is designated, since a rendering instruction of objects set to be rendered by the normal format, i.e., objects B, D, F, G, and I, is issued, scene graph data indicating the hierarchical structure among these five objects is required upon their rendering. Hence, when the normal format is designated, a scene graph indicating the hierarchical structure formed by objects B, D, F, G, and I is generated based on the scene graph shown in FIG. 3. More specifically, a scene graph indicating the hierarchical structure formed by only objects B, D, F, G, and I is generated while maintaining the hierarchical structure among objects B, D, F, G, and I in the hierarchical structure shown in FIG. 3.

The generated scene graph is denoted by 402 in FIG. 4. As can be seen from FIG. 4, the scene graph 402 indicating the hierarchical structure formed by only objects B, D, F, G, and I is generated while maintaining the hierarchical structure among objects B, D, F, G, and I in the hierarchical structure shown in FIG. 3.

On the other hand, when the translucent format is designated, since a rendering instruction of objects set to be rendered by the translucent format, i.e., objects C and J, is issued, scene graph data indicating the hierarchical structure between these two objects is required upon their rendering. Hence, when the translucent format is designated, a scene graph indicating the hierarchical structure formed by objects C and J is generated based on the scene graph shown in FIG. 3. More specifically, a scene graph indicating the hierarchical structure formed by only objects C and J is generated while maintaining the hierarchical structure between objects C and J in the hierarchical structure shown in FIG. 3.

The generated scene graph is denoted by 403 in FIG. 4. As can be seen from FIG. 4, the scene graph 403 indicating the hierarchical structure formed by only objects C and J is generated while maintaining the hierarchical structure between objects C and J in the hierarchical structure shown in FIG. 3.

In this way, scene graph data indicating the hierarchical structure formed by objects set with the same visual expression format as the designated visual expression format is generated using the scene graph data (corresponding to the data of the scene graph shown in FIG. 3 in the above description) read out from the virtual space information storage unit 102.

Note that the generated scene graph data is temporarily stored in the predetermined area in the RAM 502.

In the above description, the number of objects to be rendered by each visual expression format (normal format, mask format, or translucent format) is two or more. For example, the number of objects set to be rendered by the normal format may be 1 in some cases. In such case, a scene graph for the normal format includes only information such as position/orientation information and the like of this one object, and does not represent the hierarchical structure between objects. In such case, "set" in the above description includes "set having the number of elements=1".

Referring back to FIG. 2, data required to render each object set with the mask format (data that indicate z-coordinate values of pixels of each object set with the mask format) are read out from the external storage device 507 onto the RAM 502, and the update process of the Z buffer is executed in accordance with the comparison result between the z-coordinate values indicated by the data required to render each object set with the mask format and those which are previously stored in the Z buffer using the readout data and the scene graph data corresponding to the set of objects which is generated in step S206 and is set with the mask format (step S207).

Data required to render each object set with the normal format are read out from the external storage device 507 onto the RAM 502, and the aforementioned process for writing data required to render each object set with the normal format in the frame buffer is executed while comparing to the z-coordinate values stored in the Z buffer using the readout data and the scene graph data corresponding to the set of objects which is generated in step S206 and is set with the normal format (step S208).

Data required to render each object set with the translucent format are read out from the external storage device 507 onto the RAM 502, and the blending process of data of an image previously stored in the frame buffer and data required to render each object set with the translucent format is executed using the readout data and the scene graph data corresponding to the set of objects which is generated in step S206 and is set with the translucent format (step S209).

In this embodiment, this blending process is done according to the following procedure. Let X be the value of the pixel of interest in an image which is previously stored in the frame buffer, and Y be the value of a pixel to be blended at the position of this pixel of interest (a pixel in an object set with the translucent format). $Z=X+Y$ is calculated to update the pixel value of the pixel of interest in the frame buffer to Z.

Note that the blending process is not limited to such process, and a known $\alpha$ blending process may be applied.

With the above processes, since an image generated by superimposing the virtual space image (object images based on respective visual expression formats) onto the real space image is stored in the frame buffer, that image is output to the display unit of the HMD via the I/F 509. When the HMD is of optical see-through type, only the virtual space image is stored in the frame buffer. Also, only the virtual space image is output to the display unit of the HMD.

If an instruction to complete the aforementioned processes is input to the CPU 501 using the keyboard 504 or mouse 505, this process ends; otherwise, the flow returns to step S202 to repeat the aforementioned processes.

As described above, according to this embodiment, when images of respective objects which form the virtual space are to be rendered, the rendering order can be prevented from becoming complicated unlike in the prior art.

Also, in order to perform rendering for each set of objects with the same visual expression format, for example, a scene graph for each visual expression format (e.g., FIG. 4) must be generated. However, since object images can be rendered according to the scene graph shown in FIG. 3 transparently for a scene creator, the load on the creator can be reduced.

Since no rendering mechanism that makes the creator consider the rendering order and rendering method for each the characteristics of appearance (i.e., visual expression format) of each object need be prepared, the load on the creator can be reduced, and MR can be presented with a simpler arrangement.

Second Embodiment

In the mask object rendering process in step S207, let X be the value of the pixel of interest in an image which is previously stored in the frame buffer, and Y be the value of a pixel to be blended at the position of this pixel of interest in each mask object image. Then, Z=X+Y may be calculated to update the pixel value of the pixel of interest in the frame buffer to Z.

In this case, an effect as if a real object were illuminated with a virtual light source can be obtained.

Whether or not such frame buffer update process in step S207 is to be executed may be selected. This selection may be made using the keyboard 504 or mouse 505, or data indicating whether or not such update process is executed may be appended for each object, and the CPU 501 may switch whether or not the update process is executed for each object upon rendering.

Another Embodiment

The object of the present invention is also achieved when a recording medium (or storage medium) which records software program codes for realizing the functions of the above-described embodiments is supplied to a system or apparatus, and the computer (or the CPU or MPU) of the system or apparatus reads out and executes the program codes recorded on the recording medium. In this case, the program codes read out from the recording medium realize the functions of the above-described embodiments, and the recording medium which records the program codes constitutes the present invention.

The functions of the above-described embodiments are realized when the computer executes the readout program codes. Also, the functions of the above-described embodiments are realized when an OS (Operating System) or the like running on the computer performs some or all of actual processes on the basis of the instructions of the program codes.

Furthermore, the present invention includes a case in which, after the program codes read out from the recording medium are written in the memory of a function expansion card inserted into the computer or the memory of a function expansion unit connected to the computer, the CPU of the function expansion card or function expansion unit performs some or all of actual processes on the basis of the instructions of the program codes and thereby realizes the functions of the above-described embodiments.

When the present invention is applied to the recording medium, the recording medium records program codes corresponding to the above-described flowcharts.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2003-386937 filed on Nov. 17, 2003, which is hereby incorporated by reference herein.

What is claimed is:

1. A mixed reality presentation method for generating a virtual space image to be superimposed on a real space, comprising:
    a holding step of holding data indicating a hierarchical structure of objects that form a virtual space;
    a configuration step of configuring a first set of objects, a second set of objects, and a third set of objects from the objects forming the virtual space, with the first set, the second set, and the third set being rendered by first, second, and third rendering methods, respectively;
    a generation step of generating first, second, and third hierarchical structures of objects included in each of the first, the second and the third sets configured in the configuration step with reference to the data held in the holding step;
    a first rendering step of rendering, in a first buffer memory, each object included in the first set configured in the configuration step in accordance with the first hierarchical structure generated in the generation step;
    a second rendering step of rendering, in a second buffer memory, each object included in the second set configured in the configuration step in accordance with the second hierarchical structure generated in the generation step and each object rendered in the first buffer memory in the first rendering step, wherein the second rendering step is executed after processing of the first rendering step;
    a third rendering step of rendering, in the second buffer memory, each object included in the third set configured in the configuration step in accordance with the third hierarchical structure generated in the generation step, wherein the third rendering step is executed after processing of the second rendering step; and
    an output step of outputting data rendered in the second buffer memory to a display unit;
    wherein the first set of objects are mask objects, the second set of objects are normal virtual CG objects, and the third set of objects are translucent objects.

2. A mixed reality presentation apparatus for generating a virtual space image to be superimposed on a real space, comprising:
    a holding unit adapted to hold data indicating a hierarchical structure of objects that form a virtual space;
    a configuration unit adapted to configure a first set of objects, a second set of objects, and a third set of objects from the objects forming the virtual space, with the first set, the second set, and the third set being rendered by first, second, and third rendering methods, respectively;
    a generation unit adapted to generate first, second and third hierarchical structures of objects included in each of the first, the second and the third sets configured by said configuration unit with reference to the data held by said holding unit;
    a first rendering unit adapted to render, in a first buffer memory, each object included in the first set configured by said configuration unit in accordance with the first hierarchical structure generated by said generation unit;

a second rendering unit adapted to render, in a second buffer memory, each object included in the second set configured by the configuration unit in accordance with the second hierarchical structure generated by said generation unit and each object rendered in the first buffer memory by said first rendering unit, wherein rendering by said second rendering unit is executed after rendering by said first rendering unit;

a third rendering unit adapted to render, in the second buffer memory, each object included in the third set configured by said configuration unit in accordance with the third hierarchical structure generated by said generation unit, wherein rendering by said third rendering unit is executed after rendering by said second rendering unit; and an output unit adapted to output data rendered in the second buffer memory to a display unit, wherein the first set of objects are mask objects, the second set of objects are normal virtual CG objects, and the third set of objects are translucent objects.

3. A computer-readable medium encoded with a computer program a comprising computer-executable code for executing a mixed reality presentation method for generating a virtual space image to be superimposed on a real space, the computer program executing:

a holding step of holding data indicating a hierarchical structure of objects that form a virtual space;

a configuration step of configuring a first set of objects, a second set of objects, and a third set of objects from the objects forming the virtual space, with the first set, the second set, and the third set being rendered by first, second, and third rendering methods, respectively;

a generation step of generating first, second, and third hierarchical structures of objects included in each of the first, the second and the third sets configured in the configuration step with reference to the data held in the holding step;

a first rendering step of rendering, in a first buffer memory, each object included in the first set configured in the configuration step in accordance with the first hierarchical structure generated in the generation step;

a second rendering step of rendering, in a second buffer memory, each object included in the second set configured in the configuration step in accordance with the second hierarchical structure generated in the generation step and each object rendered in the first buffer memory in the first rendering step, wherein the second rendering step is executed after processing of the first rendering step;

a third rendering step of rendering, in the second buffer memory, each object included in the third set configured in the configuration step in accordance with the third hierarchical structure generated in the generation step, wherein the third rendering step is executed after processing of the second rendering step; and an output step of outputting data rendered in the second buffer memory to a display unit, wherein the first set of objects are mask objects, the second set of objects are normal virtual CG objects, and the third set of objects are translucent objects.

4. A computer-readable storage medium storing a computer program code for realizing a method for generating a virtual space image to be superimposed on a real space, the computer program executing:

a holding step of holding data indicating a hierarchical structure of objects that form a virtual space;

a configuration step of configuring a first set of objects, a second set of objects, and a third set of objects from the objects forming the virtual space, with the first set, the second set, and the third set being rendered by first, second, and third rendering methods, respectively;

a generation step of generating first, second, and third hierarchical structures of objects included in each of the first, the second and the third sets configured in the configuration step with reference to the data held in the holding step;

a first rendering step of rendering, in a first buffer memory, each object included in the first set configured in the configuration step in accordance with the first hierarchical structure generated in the generation step;

a second rendering step of rendering, in a second buffer memory, each object included in the second set configured in the configuration step in accordance with the second hierarchical structure generated in the generation step and each object rendered in the first buffer memory in the first rendering step, wherein the second rendering step is executed after processing of the first rendering step;

a third rendering step of rendering, in the second buffer memory, each object included in the third set configured in the configuration step in accordance with the third hierarchical structure generated in the generation step, wherein the third rendering step is executed after processing of the second rendering step; and an output step of outputting data rendered in the second buffer memory to a display unit, wherein the first set of objects are mask objects, the second set of objects are normal virtual CG objects, and the third set of objects are translucent objects.

5. The method according to claim 1, further comprising an image input step of taking an image of the real space and rendering the taken image in the first buffer memory, wherein the first rendering step is executed after execution of the image input step.

6. The method according to claim 1, wherein the first buffer memory is a Z-buffer and the second buffer memory is a frame buffer.

7. The method according to claim 1, wherein the display unit is a HMD-type display unit.

* * * * *

UNITED STATES PATENT AND TRADEMARK OFFICE
CERTIFICATE OF CORRECTION

PATENT NO. : 7,199,807 B2  
APPLICATION NO. : 10/981563  
DATED : April 3, 2007  
INVENTOR(S) : Toshihiro Kobayashi et al.

Page 1 of 1

It is certified that error appears in the above-identified patent and that said Letters Patent is hereby corrected as shown below:

<u>COLUMN 10</u>:

Line 67, "circles," should read --squares,--.

<u>COLUMN 11</u>:

Line 2, "circles," should read --hexagons,--.

<u>COLUMN 14</u>:

Line 44, "unit;" should read --unit,--.

<u>COLUMN 15</u>:

Line 22, delete "a".

Signed and Sealed this

Twenty-first Day of October, 2008

JON W. DUDAS  
*Director of the United States Patent and Trademark Office*